(12) United States Patent
Nanda (10) Patent No.: US 10,097,003 B2
(45) Date of Patent: Oct. 9, 2018

(54) SYSTEM AND METHOD FOR MANAGING THE DELIVERY OF ELECTRIC POWER

(71) Applicant: Kartik Nanda, Wilmington, DE (US)

(72) Inventor: Kartik Nanda, Wilmington, DE (US)

(*) Notice: Subject to any disclaimer, the term of this patent is extended or adjusted under 35 U.S.C. 154(b) by 155 days.

(21) Appl. No.: 15/202,659

(22) Filed: Jul. 6, 2016

(65) Prior Publication Data

US 2017/0012429 A1 Jan. 12, 2017

Related U.S. Application Data

(60) Provisional application No. 62/188,842, filed on Jul. 6, 2015.

(51) Int. Cl.
*H02J 3/38* (2006.01)
*H02J 3/14* (2006.01)

(52) U.S. Cl.
CPC .......... *H02J 3/382* (2013.01); *H02J 3/14* (2013.01); *H02J 3/383* (2013.01); *H02J 3/386* (2013.01); *H02J 2003/143* (2013.01); *Y02B 70/3225* (2013.01); *Y02B 70/3266* (2013.01); *Y02E 10/563* (2013.01); *Y02E 10/763* (2013.01); *Y04S 20/222* (2013.01); *Y04S 20/242* (2013.01)

(58) Field of Classification Search
CPC ........ H02J 3/00; H02J 5/00; H02J 3/38; H02J 3/382; H02J 3/383; H02J 3/386; H02J 3/14; H02J 2003/143; Y02B 70/3225; Y02B 7/3266; Y02E 10/563; Y02E 10/763; Y04S 20/222; Y04S 20/242
See application file for complete search history.

(56) References Cited

U.S. PATENT DOCUMENTS

| | | | | |
|---|---|---|---|---|
| 8,093,858 B1* | 1/2012 | Kadah | ............ | H02P 1/42 318/786 |
| 2007/0219749 A1* | 9/2007 | Jayabalan | ............ | G01R 31/40 702/182 |
| 2013/0307340 A1* | 11/2013 | Subramanium | ............ | H02J 5/00 307/72 |
| 2015/0295405 A1* | 10/2015 | Black | ............ | H02J 4/00 700/295 |

\* cited by examiner

*Primary Examiner* — Robert DeBeradinis
(74) *Attorney, Agent, or Firm* — Occhiuti & Rohlicek LLP (57) ABSTRACT

A system for managing delivery of electric power includes at least one source of electric power supplying an aggregate amount of available power and a plurality of electrical loads, each having a priority designation. There is a power management system electrically connected to the source of electrical power and to the plurality of electrical loads. The power management system monitors electrical power demanded by the electrical loads and the aggregate amount of available power of the at least one source of electric power. When the power management system determines that the aggregate demanded power exceeds the aggregate amount of available power, the power management system continues to provide power to each of said electrical loads but at a power level which is less than demanded to one or more of said plurality of electrical loads based on the priority designation of each of said electrical loads.

19 Claims, 6 Drawing Sheets

SYSTEM AND METHOD FOR MANAGING THE DELIVERY OF ELECTRIC POWER

CROSS-REFERENCE TO RELATED APPLICATIONS

This application claims the priority of U.S. Provisional Application No. 62/188,842 filed on Jul. 6, 2015. The contents of the above-referenced application is incorporated herein by reference in its entirety.

FIELD OF INVENTION

The present invention relates to a system and method for managing the delivery of electric power.

BACKGROUND

A problem in many electric power systems, in particular in developing countries, is that the demanded power by consumers often exceeds the available power generated by the source(s) in the power system. This often results in black out conditions in all or portions of the electric power grid at various time of the day, which is very disruptive in terms of both living conditions and business operations.

SUMMARY

Therefore, an object of this invention is to provide a system and method for managing the delivery of power to multiple loads when the power demanded by the loads exceeds the amount of power available from one or more sources in order to provide consumers with more reliable delivery of electric power.

In one aspect the invention features a system for managing delivery of electric power. The system includes at least one source of electric power supplying an aggregate amount of available power and a plurality of electrical loads, each electrical load having a priority designation. There is a power management system electrically connected to said at least one source of electrical power and electrically connected to said plurality of electrical loads. The power management system is configured to monitor electrical power demanded by said electrical loads and to monitor the aggregate amount of available power by said at least one source of electric power. When said power management system determines that the aggregate demanded power exceeds the aggregate amount of available power, said power management system is configured to continue to provide power to each of said electrical loads but at a power level which is less than demanded to one or more of said plurality of electrical loads based on the priority designation of each of said electrical loads.

In other aspects of the invention, one or more of the following features may be included. The at least one source of electrical power may include a plurality of sources of electrical power selected from the group comprising a wind farm, a solar farm, a generator, and an electric utility grid. The priority designations may be based on at least one of the following criteria: the importance of the load, electricity pricing, time, and environmental factors. The power management system may include a source controller electrically connected to the at least one source of electrical power. The power management system may include a load controller electrically connected to the plurality of electrical loads. The source controller may include a source control device for each of said at least one source of electric power and the load controller may include a load control device for each of said electrical loads. The source control devices may be connected to a common link and each source control device includes a power converter to convert the voltage of the at least one source of power to a common link voltage. Each load control device may be connected to the common link and each load control device includes a power converter to convert the common link voltage to a voltage compatible with its associated load.

In yet other aspects of the invention, one or more of the following features may be included. The common link may comprise a single bus and the common link voltage is a single DC voltage. The common link may comprise multiple busses operating at different DC voltages. Each bus of the multiple busses may be connected to each of the source control devices and each of the load control devices. Each bus of the multiple busses may be connected to each of the source control devices and to a subset of the load control devices. Each bus of the multiple busses may have an assigned priority level and wherein the amount of power that the link can draw from the at least one power source is based on the assigned priority level of the link. The power converter of each load control device may be configured to provide a first AC voltage waveform in order to deliver full power demanded by its associated load. The power converter of each load control device may be configured to provide a second AC voltage waveform in order to deliver less than full power demanded by its associated load. The second AC voltage waveform may include modifying the first AC voltage waveform by changing one or more of its voltage, frequency or shape. The source controllers may be configured to monitor the common link voltage and the load controllers are configured to monitor the common link voltage and when the common link voltage decreases below a predetermined amount, the source controllers may be configured to increase the amount of power being delivered to the common link and the load controllers may be configured to decrease power delivered to to the loads based on the priority designation of each of said electrical loads. The source controllers may be configured to monitor the common link voltage and when as the common link voltage increases above a predetermined amount indicating an excess of aggregate amount of available power compared to the aggregate demanded power, one of the load controllers may be configured to divert the excess aggregate amount of available power to its associated electrical load. The electrical load to which is diverted the excess aggregate amount of available power may comprise an energy storage device. The electrical load to which is diverted the excess aggregate amount of available power may have the lowest priority designation among the plurality of electrical loads.

Another aspect the invention features a power management system for managing delivery of electric power from at least one source of electric power supplying an aggregate amount of available power to a plurality of electrical loads. Each said electrical load having a priority designation. There is a monitoring device configured to monitor electrical power demanded by the electrical loads and the aggregate amount of available power from said at least one source of electric power and to determine when the aggregate demanded power exceeds the aggregate amount of available power. There is a control device, responsive to said monitoring device, configured to continue to provide power to each of said electrical loads but at a power level which is less than demanded to one or more of said plurality of electrical loads based on the priority designation of each of said electrical loads.

In other aspects of the invention, one or more of the following features may be included. The at least one source of electrical power may include a plurality of sources of electrical power selected from the group comprising a wind farm, a solar farm, a generator, and an electric utility grid. The priority designations may be based on at least one of the following criteria: the importance of the load, electricity pricing, time, and environmental factors. The control device may include a source controller electrically connected to the at least one source of electrical power. The control device may include a load controller electrically connected to the plurality of electrical loads. The source controller may include a source control device for each of said at least one source of electric power and the load controller includes a load control device for each of said electrical loads. The source control devices may be connected to a common link and each source control device includes a power converter to convert the voltage of the at least one source of power to a common link voltage. Each load control device may be connected to the common link and each load control device includes a power converter to convert the common link voltage to a voltage compatible with its associated load. The common link may comprise a single bus and the common link voltage is a single DC voltage. The common link may comprise multiple busses operating at different DC voltages. Each bus of the multiple busses may be connected to each of the source control devices and each of the load control devices. Each bus of the multiple busses may be connected to each of the source control devices and to a subset of the load control devices. Each bus of the multiple busses may have an assigned priority level and wherein the amount of power that the link can draw from the at least one power source is based on the assigned priority level of the link.

In further aspects of the invention, the power converter of each load control device may be configured to provide a first AC voltage waveform in order to deliver full power demanded by its associated load. The power converter of each load control device may be configured to provide a second AC voltage waveform in order to deliver less than full power demanded by its associated load. The second AC voltage waveform may include modifying the first AC voltage waveform by changing one or more of its voltage, frequency or shape. The source controllers may be configured to monitor the common link voltage and the load controllers may be configured to monitor the common link voltage and when the common link voltage decreases below a predetermined amount, the source controllers may be configured to increase the amount of power being delivered to the common link and the load controllers may be configured to decrease power delivered to the loads based on the priority designation of each of said electrical loads. The source controllers may be configured to monitor the common link voltage and when as the common link voltage increases above a predetermined amount indicating an excess of aggregate amount of available power compared to the aggregate demanded power, one of the load controllers may be configured to divert the excess aggregate amount of available power to its associated electrical load. The electrical load to which is diverted the excess aggregate amount of available power may comprise an energy storage device. The electrical load to which is diverted the excess aggregate amount of available power may have the lowest priority designation among the plurality of electrical loads.

In yet another aspect the invention features a method for managing delivery of electric power, including supplying an aggregate amount of available power from at least one source of electric power and connecting a plurality of electrical loads to said at least one source of electric power, each said electrical load having a priority designation. The method also includes monitoring the electrical power demanded by said electrical loads and the aggregate amount of available power by said at least one source of electric power and determining when the aggregate demanded power exceeds the aggregate amount of available power. The method further includes continuing to provide power to each of said electrical loads but at a power level which is less than demanded to one or more of said plurality of electrical loads based on the priority designation of each of said electrical loads.

In other aspects of the invention, one or more of the following features may be included. The at least one source of electrical power may include a plurality of sources of electrical power selected from the group comprising a wind farm, a solar farm, a generator, and an electric utility grid. The priority designations may be based on at least one of the following criteria: the importance of the load, electricity pricing, time, and environmental factors. The step of continuing to provide power to each of said electrical loads may include converting the voltage of the at least one source of power to a common link voltage. The step of continuing to provide power to each of said electrical loads may include converting the common link voltage to a voltage compatible with its associated load. The common link voltage may be a single DC voltage. The step of converting the voltage of the at least one source of power to a common link voltage may include converting the voltage of the at least one source of power to multiple DC voltages. The method may further include providing multiple electrical busses, each bus being linked to each of the at least one source of power and to each of said plurality of electrical loads. The method may also include providing multiple electrical busses, each bus being linked to each of the at least one source of power and to a subset of said plurality of electrical loads. Each bus of the multiple electrical busses may have an assigned priority level and wherein the amount of power that each bus can draw from the at least one power source may be based on the assigned priority level of the link. The step of continuing to provide power to each of said electrical loads may include providing a first AC voltage waveform in order to deliver full power demanded by each said electrical load.

In additional aspects of the invention, one or more of the following features may be included. The step of continuing to provide power to each of said electrical loads may include providing a second AC voltage waveform in order to deliver less than full power demanded by each said electrical load. The step of providing a second AC voltage waveform may include modifying the first AC voltage waveform by changing one or more of its voltage, frequency or shape. The step of monitoring may include monitoring the common link voltage and the step of determining may include determining when the common link voltage decreases below a predetermined amount. The method may further include, in response to determining when the common link voltage decreases below a predetermined amount, increasing the amount of power being delivered to the common link and decreasing the power delivered to said electrical loads based on the priority designation of each of said electrical loads. The method may also include determining when the common link voltage increases above a predetermined amount indicating an excess of aggregate amount of available power compared to the aggregate demanded power and diverting the excess aggregate amount of available power to one of said electrical loads. The electrical load to which is diverted the excess aggregate amount of available power may comprise an energy storage device. The electrical load to which is diverted the excess aggregate amount of available power may have the lowest priority designation among the plurality of electrical loads.

DETAILED DESCRIPTION

This application describes a power micro-grid system where:
power is generated, from a single or multiple diverse sources,
power is routed to multiple attached loads,
the power consumption of the loads is actively managed, using diverse means some of which are outlined in this application.

The power being generated is typically less than the maximum total power requirement of all the connected loads combined.

Figure 1:
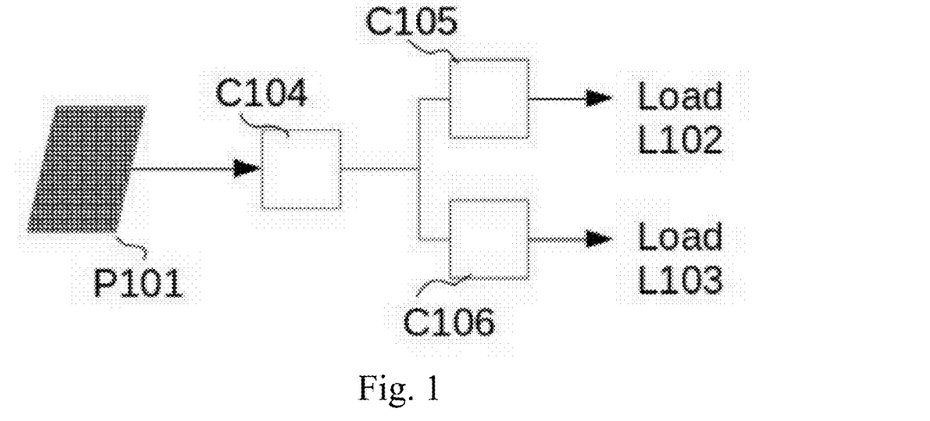
FIG. 1 is a block diagram of a system of power generation and consumption with load priorities according to this invention.

The basic example system, as shown in FIG. 1, consists of a source of power P101 (from solar photo voltaic) and two loads (L102 and L103), that consume the power being generated. The loads have a priority assigned to them, which determines the power that is available to the load. In the figure, L103 has higher priority than L102. In this case power that is being generated will first be routed to L103, and whatever is left (not consumed by L103) will then be available to L102. C104 manages the power generation from P101, and C105 and C106 manage the power that is being consumed by the attached loads.

Figure 2:
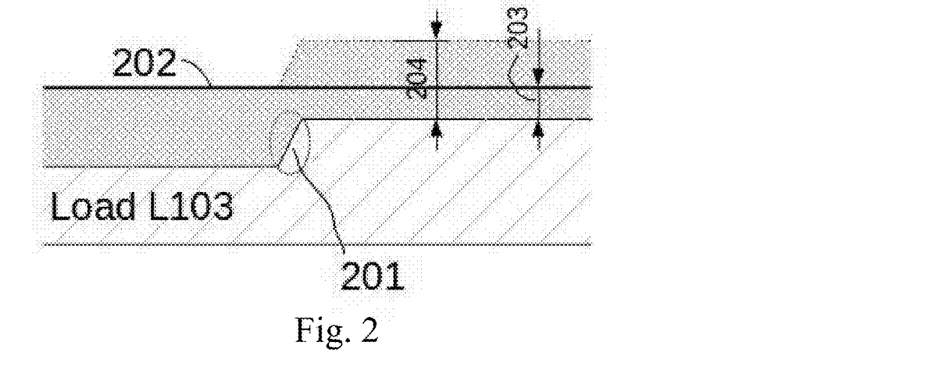
FIG. 2 is a waveform depicting the impact of load L103 increasing its consumption of power.
Figure 3:
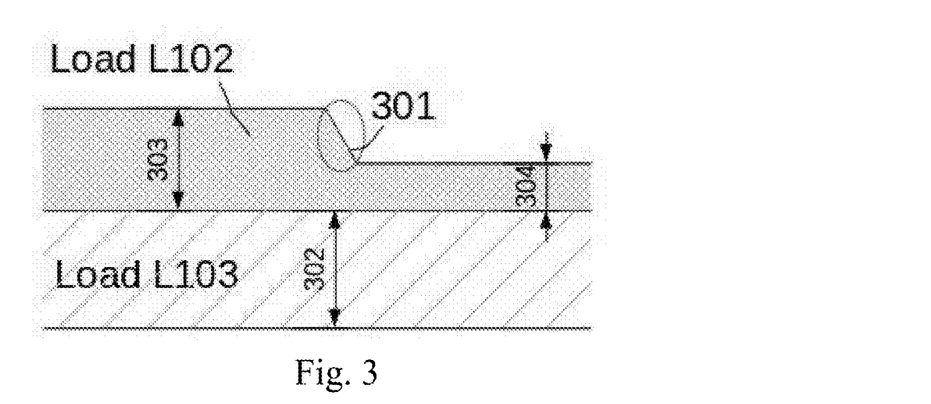
FIG. 3 is a waveform depicting the impact of a reduction in power being generated.

The priority applies in a scenario where the power input and demand varies. In FIG. 2, the power demand of L103 (of FIG. 1) increases (201). Since L103 has higher priority, more is made available to it. Since the total power being generated is fixed (202), the power available to L102 is thus reduced (203), irrespective of its actual demand (204). A similar situation arises when the power being generated falls (FIG. 3, 301). The high priority load continues to get what it needs (302) however the power available for the lower priority load reduces (as shown by 303 and 304).

It is important to note that the system places no restrictions on the total power demand, or the total available power. Either can be higher or lower than the other. However, the total power consumed obviously cannot exceed the power being generated. The system also is not restricted to one source and two loads, but can have multiple sources and loads.

In the situation when the power available is lower than the power required (as is the case in FIG. 2, 204), the controller (C105, C106 in FIG. 1) manages the load to reduce its power consumption. Some ways to achieve this are outlined in the following sections.

System Architecture

Figure 4:
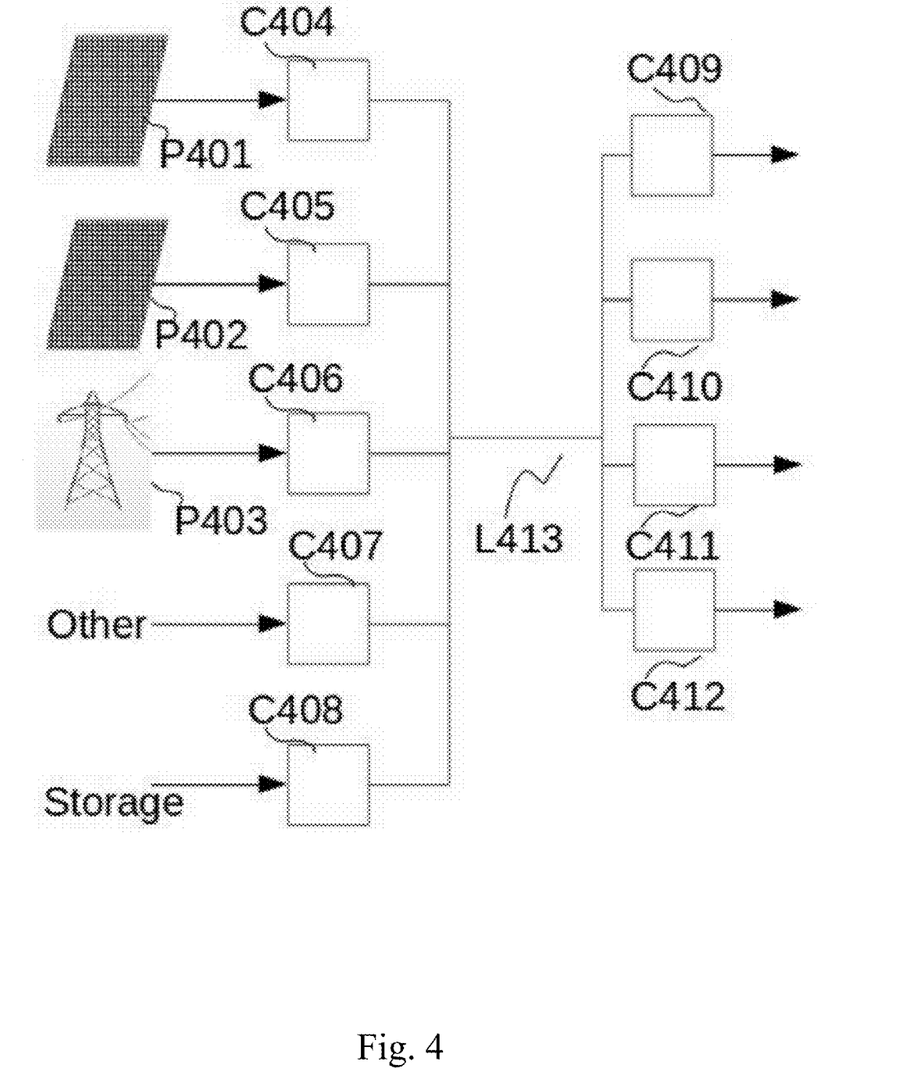
FIG. 4 is a block diagram of a system of power generation and consumption with load priorities according to this invention.

The overall system is shown in FIG. 4. It shows multiple different sources of electricity—the Grid, Solar, Wind, Generator (fossil fuel based), other non-conventional sources like Biogas, and Storage like Batteries, or other ways of storing electricity. Some key features:

Electricity can be supplied by multiple sources simultaneously, or a single source.

The sources can be intermittent (renewables are by definition—think Solar or Wind), including the Grid, which in many parts of the World is intermittent.

The system works seamlessly as sources vary, or drop out entirely.

Seamlessly Combining Power from Diverse Sources

The sources are diverse, meaning that the nature of the electricity is different. The Grid is 50 Hz (or 60 Hz) AC sine wave. Solar is a current source, a generator also outputs an AC signal but not in sync with the grid. Electricity storage is different as well—like batteries are a DC voltage source.

A key innovation is converting electricity from all of these diverse sources into a common link, C413. One example of a link is a DC link, where all sources are converted into a DC voltage. Another instance uses multiple DC link voltages, of varying levels. Yet another instance uses multiple DC links, all connected to same sources but with different priorities, so all links are not the same in the amount of power they can pull from the sources. The priorities could be different for different sources as well.

Figure 5A:
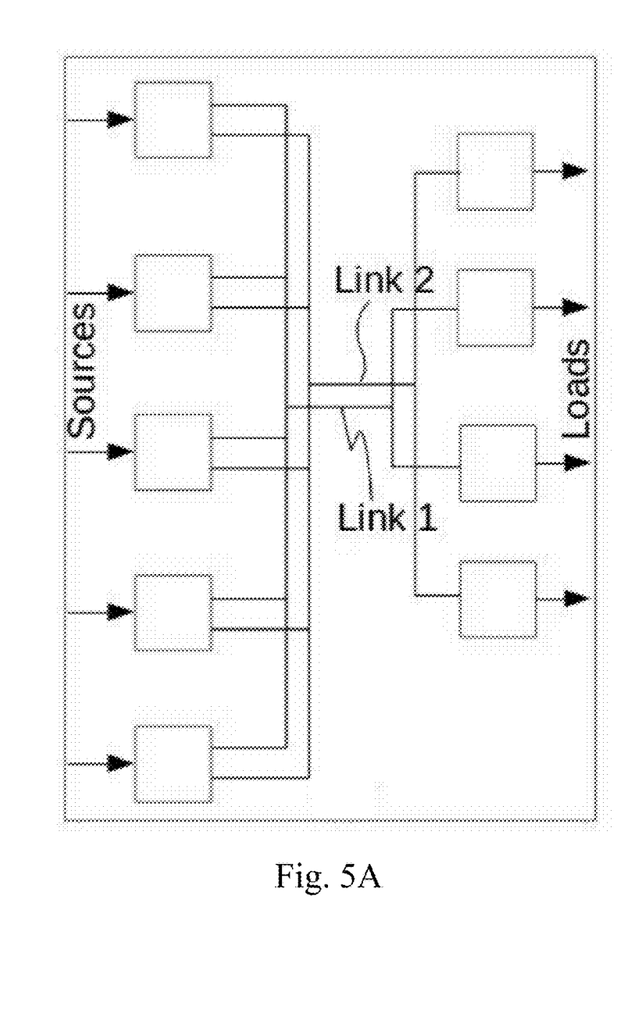
FIGS. 5A and B are block diagrams depicting alternate link connections between the sources and loads.
Figure 5B:
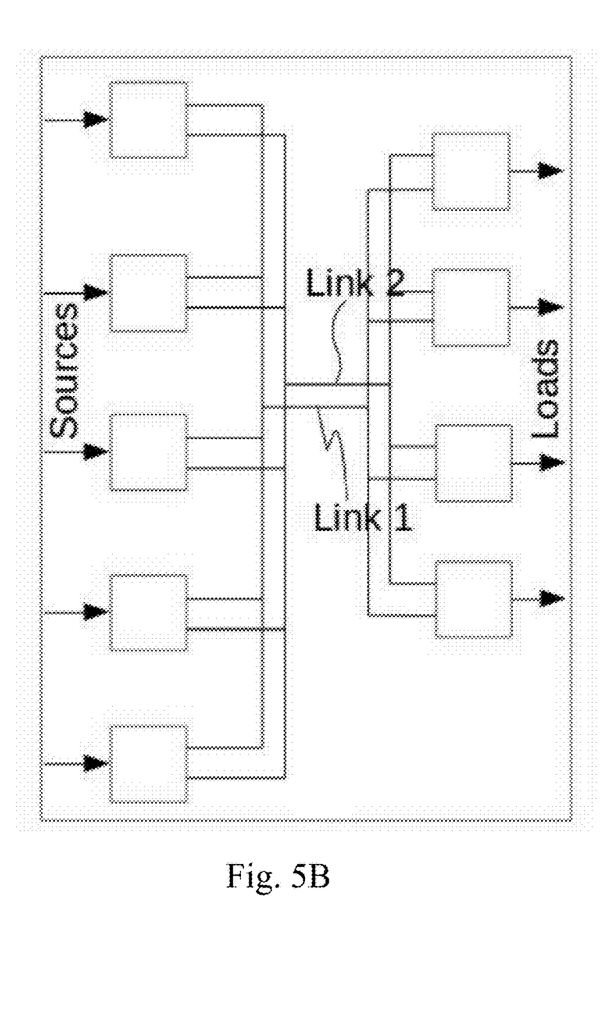

FIG. 5 shows examples of different Links and connections between the power sources and loads.

Managing Power Consumption of Loads

In a power constrained system, one where the amount of power available from the source(s) is limited, the total consumption by the loads is managed such that it does not exceed the maximum available power. This is the case when, for instance, the Grid is off, and the system is supplied by Solar only or a combination of fixed capacity sources.

One way to manage the power being consumed is to turn on/off loads based on their historical average power requirement (prior art). Another way is smart loads where loads communicate with a central controller and turn on or off.

Figure 6:
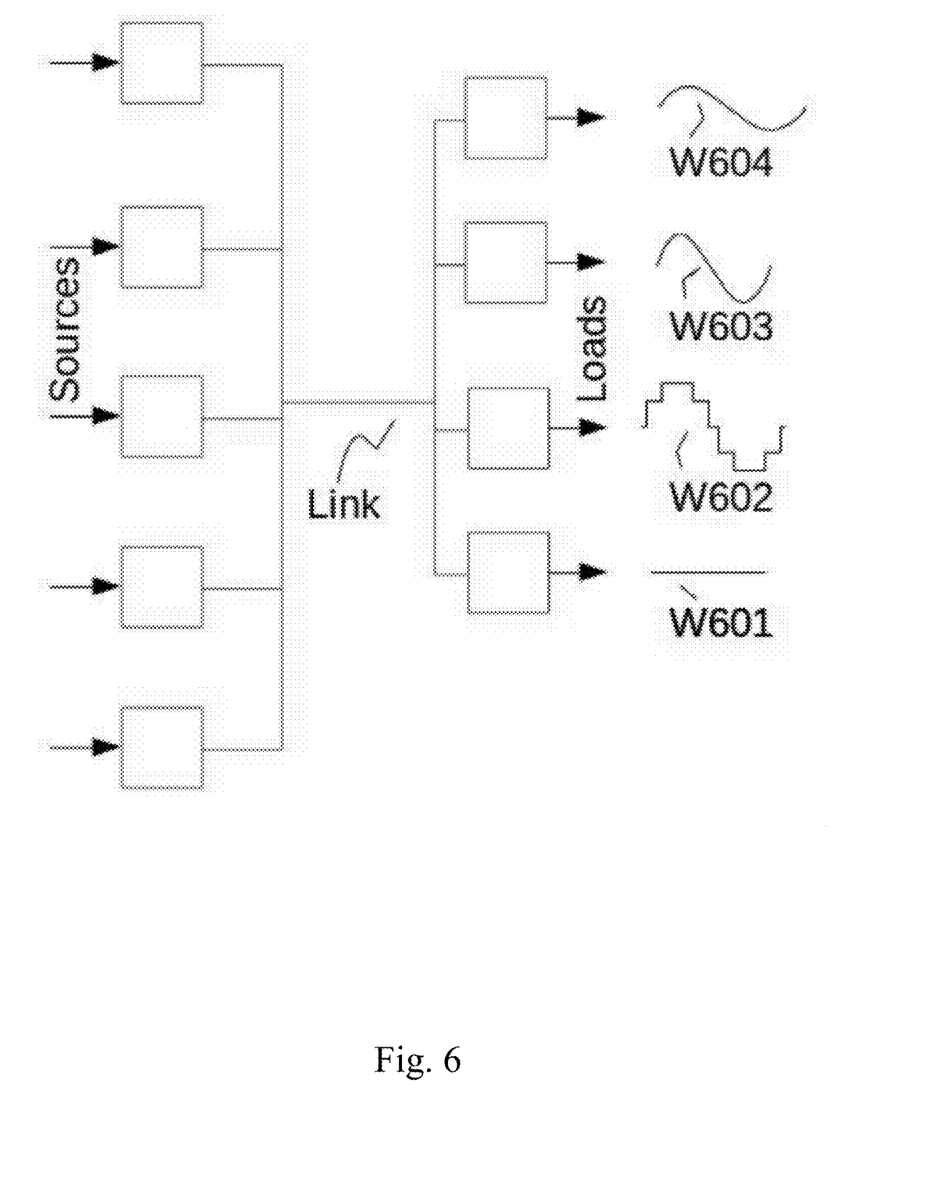
FIG. 6 is a block diagram of a system according to this invention with the load controllers generating different output waveforms.

The key innovation is to control the power being consumed by varying certain features of the waveform of the power signal being delivered to the load. The load controllers generate the output AC waveforms supplied to the attached loads from the DC link(s). Some features that can be changed are the voltage, the frequency, the shape of the power waveform. These can be used to control the power being consumed in the load. Some examples, as an illustration, are shown in FIG. 6. One possible output waveform is DC (W601), others include different frequency and voltage AC sinusoidal outputs (W603, W604). Yet others have modified waveform shapes (W602).

One example of a modified waveform is one where the sine wave of the ac waveform is not a complete sine wave—a part of every sine wave is chopped. This is done in a triac circuit for instance, which are used for dimming incandescent light bulbs. Another example is Adjustable Speed Drives for motors which generate different frequency and voltage outputs to control the speed of the motor. The intent of the example circuits is not to reduce the power but to control certain desired aspect of the load—its speed, light intensity etc. This application discloses the use of the same techniques to manage the power (rather than a user desired aspect) and other similar techniques to manage the power being consumed by the load. For instance, this application envisions the controller automatically reducing the light intensity in response to a request to reduce the power being consumed, without any input from the user. Similarly power being consumed by pumps and air conditioners can be controlled by varying the voltage and frequency of the ac power waveform.

Dividing the Available Power Between the Loads

Since the power available is limited, how should it be divided between the connected loads? One simple way is budgeting—amount of power is allocated to the various loads. Static allocation however is inefficient in its use of the available power.

Figure 7:
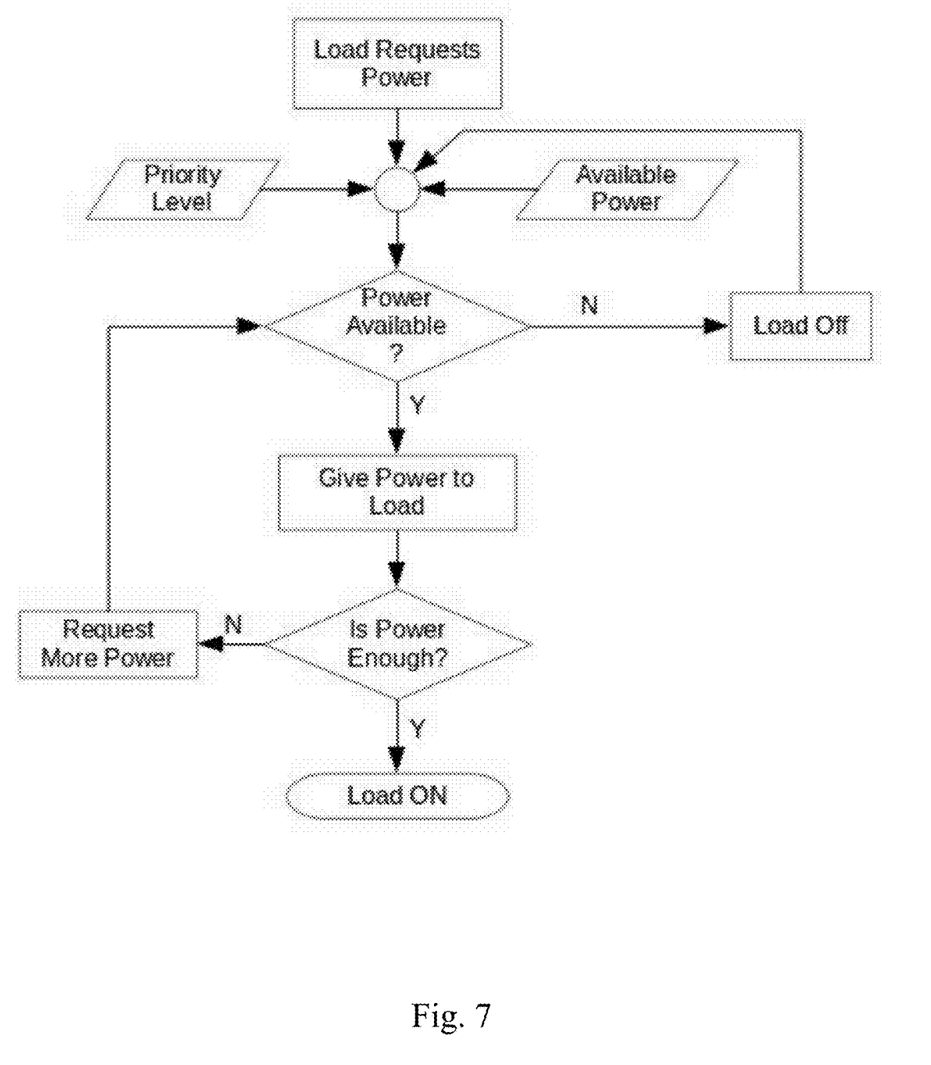
FIG. 7 is a flow chart depicting a load controller algorithm according to this invention.

Dynamic allocation is one possible solution. The power available to a load depends on its static allocation, the total power available in the system and a priority, to resolve contention between loads. In effect, the various loads request power and a central controller decides how much power can be routed to any given load. The variables the controller uses include the available power, the requested power, and priorities of the loads (FIG. 7).

The priorities could be pre-assigned and fixed, or could vary based on different criteria—time of the day, day of the week/month/year, the season, environmental factors, perceived importance of the load, the price the load is willing to pay for the electricity, and other possibilities.

Figure 8:
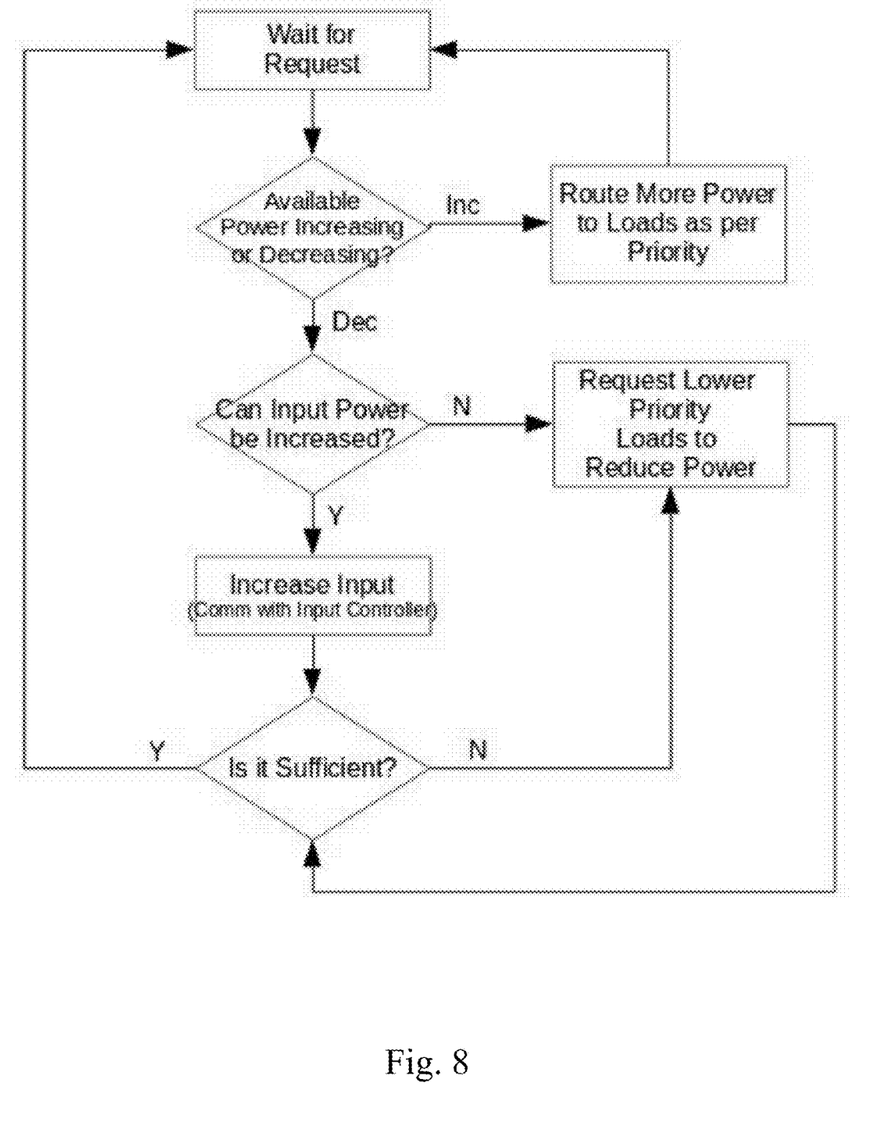
FIG. 8 is a flow chart of a central controller algorithm according to this invention.

The above example assumes a central controller where all the communication is directed to and the decisions taken (FIG. 8 shows an example flow chart for the central controller). Another approach outlined next does not rely on a central controller at all. The DC link voltage is used by the various load controllers to decide if, and how much, power can be routed to the attached load.

Concept: The system relies on the fact that power input has to equal power output. The DC link is a regulated voltage—if the input exceeds the output, the DC link voltage will rise. The controllers on the generation side see this and reduce the power being delivered to the system. If the link voltage starts to fall, the controllers on the generation side increase the power output. Simultaneously, the load side controllers start to reduce the power being consumed by the loads. The idea of priorities can be easily overlaid on top of this. Controllers of higher priority loads start to limit the power later than controllers of loads with lower priorities.

Dump Load:

In the above system, a dump load is one which consumes any excess power being generated. This is chiefly applicable to systems where electricity is being generated from renewable sources like wind, solar. The system, as described, does not require (or assume) any intermediate storage and power in equals power out. In the scenario where the input is more than the output, the described algorithm reduces the power being generated.

An alternative approach is to route the excess power to a "dump load". Key characteristics:

The dump load consumes as much power as is available to it.

The dump load has the lowest priority in the system.

The creation of a dump load simplifies the control of the source—the controller manages and produces the maximum power from the source, irrespective of the attached load. The dump load provides a similar function as a release valve. In addition it gives an exact measure of how much excess power is available in the system.

The dump load could be purely a waste (like an actual release valve), where the excess power is thrown away, or it could store the excess power and make it available at a later stage, like a battery. Yet another dump load is the grid which can absorb the excess. There could be multiple dump loads, for example, a grid connection for when the grid is available, and storage when the grid is not.

EXAMPLES

Example One is a single residence. The various loads are the appliances within the home. The home (in one instance) is divided into electric zones which have different priorities. The highest priority loads might be the water pump, Internet connectivity, phones etc. Lights and fans, refrigerator might be priority two, and air conditioners, kitchen appliances might be priority three. A forth priority might be a battery that charges if excess power is available after all the loads are driven.

As an example of varying priorities, consider lights in a home. Lights are priority one when it's darker outside, and lower during the day when natural light is abundant.

Example Two is a small community, like a village. The loads there are houses, to water pumps, small commercial, a school, community lighting etc. One scenario is a village that is not tied to the electricity grid, and generates its own electricity from Solar, Biogas, Wind, or any other source or mixture of sources. Priorities assigned to the various loads balances the generation and the consumption. For instance, houses might be lower priority during the day (school and commercial being higher, and irrigation higher still) and higher during the evening and night. Excess electricity in this scenario is either stored, or discarded.

In another scenario, the village is tied to the grid but produces its own electricity. This case could be treated the same as the previous case, with priorities. The goal then is different—to buy electricity from the grid or not to, when to buy (if the cost of electricity varies during the day), and when to sell to the grid. The grid is then both a generator, and a load with priority assigned to it. If it has the lowest priority, any excess electricity that is not consumed within the village is sold to the grid. But the grid could be a higher priority where electricity is first sold to the grid and then consumed within the homes during the day (higher than homes but lower than water pumps). The priority might also be based on the amount of electricity generated, or the amount sold to the grid, that is to say, the amount being sold to the grid is capped after which the priority falls.

What is claimed is:

1. A system for managing delivery of electric power, comprising:

at least one source of electric power supplying an aggregate amount of available power;

a plurality of electrical loads, each of said plurality of electrical loads having a priority designation;

a power management system electrically connected to said at least one source of electrical power and electrically connected to said plurality of electrical loads;

wherein said power management system is configured to monitor electrical power demanded by said plurality of electrical loads and to monitor the aggregate amount of available power by said at least one source of electric power and wherein, when said power management system determines that the aggregate demanded power exceeds the aggregate amount of available power, said power management system is configured to continue to provide power to each of said plurality of electrical loads but at resultant power levels which is less than demanded to one or more of said plurality of electrical loads based on the priority designation of the each of said plurality of electrical loads, wherein the power management system configured to continue to provide power is configured to adjust power waveforms for the power delivered to the each of said plurality of electrical loads based on the priority designations of the each of said plurality of electrical loads such that the adjusted power waveforms correspond to the resultant power levels to the each of said plurality of electrical loads.

2. The system of claim 1 wherein the at least one source of electrical power includes a plurality of sources of electrical power selected from the group comprising a wind farm, a solar farm, a generator, and an electric utility grid.

3. The system of claim 1 wherein the priority designations are based on at least one of the following criteria: the importance of the load, electricity pricing, time, and environmental factors.

4. The system of claim 1 wherein the power management system includes a source controller electrically connected to the at least one source of electrical power.

5. The system of claim 4 wherein the power management system includes a load controller electrically connected to the plurality of electrical loads.

6. The system of claim 5 wherein the source controller includes a source control device for each of said at least one source of electric power and the load controller includes a load control device for each of said electrical loads.

7. The system of claim 6 wherein the source control devices are connected to at least one common link and each source control device includes a power converter to convert the voltage of the at least one source of power to at least one common link voltage, and wherein the load control device for the each of said plurality of electrical loads includes a power converter to convert the at least one common link voltage to a voltage compatible with the respective each of said plurality of electric loads based at least on a voltage level of the at least one common link voltage and based on the priority designation for the each of said plurality of electrical loads.

8. The system of claim 7, wherein the at least one common link comprises a single bus and the at least one common link voltage is a single DC voltage.

9. The system of claim 7, wherein the at least one common link comprises multiple busses operating at different DC voltages.

10. The system of claim 9 wherein each bus of the multiple busses is connected to each of the source control devices and each of the load control devices.

11. The system of claim 9 wherein each bus of the multiple busses is connected to each of the source control devices and to a subset of the load control devices.

12. The system of claim 9 wherein each bus of the multiple busses has an assigned priority level and wherein the amount of power that the link can draw from the at least one power source is based on the assigned priority level of the link.

13. The system of claim 7, wherein the power converter of each load control device is configured to provide a first AC voltage waveform in order to deliver full power demanded by its associated load.

14. The system of claim 13 wherein the power converter of each load control device is configured to provide a second AC voltage waveform in order to deliver less than full power demanded by its associated load.

15. The system of claim 14 wherein the second AC voltage waveform includes modifying the first AC voltage waveform by changing one or more of its voltage, frequency or shape.

16. The system of claim 7, wherein the source controllers are configured to monitor the at least one common link voltage and the load controllers are configured to monitor the at least one common link voltage, and when the at least one common link voltage decreases below a predetermined amount, the source controllers are configured to increase the amount of power being delivered to the common link and the load controllers are configured to decrease power delivered to the loads based on the priority designation of the each of said plurality of electrical loads.

17. The system of claim 7, wherein the source controllers are configured to monitor the at least one common link voltage and when as the at least one common link voltage increases above a predetermined amount indicating an excess of aggregate amount of available power compared to the aggregate demanded power, one of the load controllers is configured to divert the excess aggregate amount of available power to its associated electrical load.

18. The system of claim 17 wherein the electrical load to which is diverted the excess aggregate amount of available power comprises an energy storage device.

19. The system of claim 18 wherein the electrical load to which is diverted the excess aggregate amount of available power has the lowest priority designation among the plurality of electrical loads.

* * * * *